(12) United States Patent
Someno (10) Patent No.: US 7,841,530 B2
(45) Date of Patent: Nov. 30, 2010

(54) READ HEAD FOR READING CODED DATA BY OPTICAL SCANNING

(75) Inventor: Yoshihiro Someno, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/466,349

(22) Filed: May 14, 2009

(65) Prior Publication Data

US 2009/0224049 A1    Sep. 10, 2009

Related U.S. Application Data

(63) Continuation of application No. PCT/JP2007/072163, filed on Nov. 15, 2007.

(30) Foreign Application Priority Data

Nov. 17, 2006   (JP) .............................. 2006-311165

(51) Int. Cl.
*G06K 7/10* (2006.01)
*G06K 7/00* (2006.01)
*G06K 19/06* (2006.01)

(52) U.S. Cl. ....................... 235/454; 235/435; 235/439; 235/493

(58) Field of Classification Search .................. 235/457, 235/462.34, 493
See application file for complete search history.

(56) References Cited

U.S. PATENT DOCUMENTS

| | | | | |
|---|---|---|---|---|
| 5,619,026 | A * | 4/1997 | Chou et al. ............ | 235/462.16 |
| 6,527,180 | B1 * | 3/2003 | Dvorkis et al. ......... | 235/462.01 |
| 2002/0018247 | A1 | 2/2002 | Hanabusa | |

(Continued)

FOREIGN PATENT DOCUMENTS

JP    3-264911    11/1991

(Continued)

OTHER PUBLICATIONS

English Translation of JP 2001-264667, Hidekuni, et al., "Optical Scannig Device".*

(Continued)

*Primary Examiner*—Michael G Lee
*Assistant Examiner*—Matthew Mikels
(74) *Attorney, Agent, or Firm*—Beyer Law Group LLP (57) ABSTRACT

A read head includes a light emitting member outputting a predetermined laser beam to a data recording portion, a light receiving member receiving a return beam reflected by the data recording portion and detecting data included in the return beam, a movable section mounted with the light emitting member and the light receiving member, a support mechanism swingably supporting the movable section, and a driving mechanism swinging the movable section. Here, the driving mechanism includes a magnetic field generator disposed in one of the movable section and a fixed section and a magnetic driver disposed in the other and the magnetic field generator includes a first yoke, a second yoke, and a magnet disposed between the first yoke and the second yoke, the first yoke and the second yoke are opposed to each other, and the magnetic driver includes a plurality of coils. In addition, arm portions protruding in multiple directions from one of the yokes are disposed in the coils with a movement margin, respectively.

9 Claims, 4 Drawing Sheets

U.S. PATENT DOCUMENTS

2005/0092842 A1 * 5/2005 Shimizu et al. ........ 235/462.33

FOREIGN PATENT DOCUMENTS

| | | |
|---|---|---|
| JP | 2001-264667 | 9/2001 |
| JP | 2003-30580 | 1/2003 |
| JP | 2003-216889 | 7/2003 |
| JP | 2004-20956 | 1/2004 |
| JP | 2004-199266 | 7/2004 |
| JP | 2004-301888 | 10/2004 |
| JP | 2006-3554 | 1/2006 |
| JP | 2006-209613 | 8/2006 |
| JP | 2007-72168 | 3/2007 |
| JP | 2007-72756 | 3/2007 |
| WO | 2007/135999 | 12/2007 |
| WO | 2007/145236 | 12/2007 |

OTHER PUBLICATIONS

Search Report for International Application No. PCT/JP2007/072163 dated Feb. 19, 2008.

* cited by examiner

FIG. 4

READ HEAD FOR READING CODED DATA BY OPTICAL SCANNING

CROSS REFERENCE TO RELATED APPLICATIONS

This application is a continuation of International Application No. PCT/JP2007/072163, filed on Nov. 15, 2007, which claims benefit of Japanese Application No. 2006-311165, filed on Nov. 17, 2006, the entire contents of both are incorporated herein by reference.

BACKGROUND

1. Technical Field

The present invention relates to a read head reading coded data by optical scanning.

2. Related Art

Japanese Unexamined Patent Application Publication No. 2003-30580 and Japanese Unexamined Patent Application Publication No. 2004-199266 disclose a barcode reader which allows a movable mirror to reflect a laser beam emitted from a light emitting element, swings the movable mirror to apply the laser beam to a target (barcode), allows the movable mirror to reflect a return beam from the target, and allows a light receiving element to receive the return beam.

However, since the barcode readers disclosed in Patent Documents 1 and 2 both have a movable mirror, which can be swung, separately from the light emitting element and the light receiving element, it is difficult to reduce the cost and the size.

Since the light emitting element and the light receiving element are generally fixed to a fixed section, the movable range of the mirror may be narrowed depending on the position relation relative to the mirror and thus the readable range of the barcode reader may be easily limited.

When a barcode is generated by holography, the barcode can be recorded in a multiplexing manner (angle-multiplexed recording or wavelength-multiplexed recording), thereby greatly enhancing the capacity of the barcode.

However, a barcode reader (read head) for reading data such as a barcode multiply recorded by holography did not exist in the past.

SUMMARY

An advantage of some aspects of the invention is that it provides a read head which can accomplish a decrease in cost and a decrease in size by reducing the number of components.

Another advantage of some aspects of the invention is that it provides a read head of which a readable range can be widened.

Another advantage of some aspects of the invention is that it provides a read head which can detect data (code) recorded by holography or the like.

According to an aspect of the invention, there is provided a read head including a light emitting member outputting a predetermined laser beam to a data recording portion, a light receiving member receiving a return beam reflected by the data recording portion and detecting data included in the return beam, a movable section mounted with the light emitting member and the light receiving member, a support mechanism swingably supporting the movable section, and a driving mechanism swinging the movable section, wherein the driving mechanism includes a magnetic field generator disposed in one of the movable section and a fixed section and a magnetic driver disposed in the other, wherein the magnetic field generator includes a first yoke, a second yoke, and a magnet disposed between the first yoke and the second yoke, the first yoke and the second yoke are opposed to each other, and the magnetic driver includes a plurality of coils, and wherein arm portions protruding in multiple directions from one of the yokes are disposed in the coils with a movement margin, respectively.

In the invention, since the movable section mounted with the light emitting member and the light receiving member can be directly swung, the mirror necessary in the past need not be used. Accordingly, it is possible to accomplish a decrease in manufacturing cost and a decrease in size by reducing the number of components.

It is preferable that the read head further includes a control unit generating a feedback signal for controlling the posture of the movable section on the basis of the data detected by the light receiving member.

According to this configuration, the read head can change its posture to a posture with which it can easily acquire data.

For example, the light receiving member may be one of a CCD, a CMOS image sensor, and a PD.

The data included in the return beam may be hologram data. In this case, desired hologram data can be read from data groups (book) multiply recorded as the hologram data.

According to this configuration, since the movable range of the movable section can be widened, it is possible to widening the readable range as a result.

According to the above-mentioned configuration, since the mirror necessary in the past need not be used, it is possible to accomplish the decrease in cost and size by reducing the number of components.

Since the light emitting member and the light receiving member can be mounted on the movable section of an actuator and thus can be freely swung, it is possible to widen the readable range.

It is possible to detect hologram data multiply recorded by holography.

DESCRIPTION OF EXEMPLARY EMBODIMENTS

Figure 1:
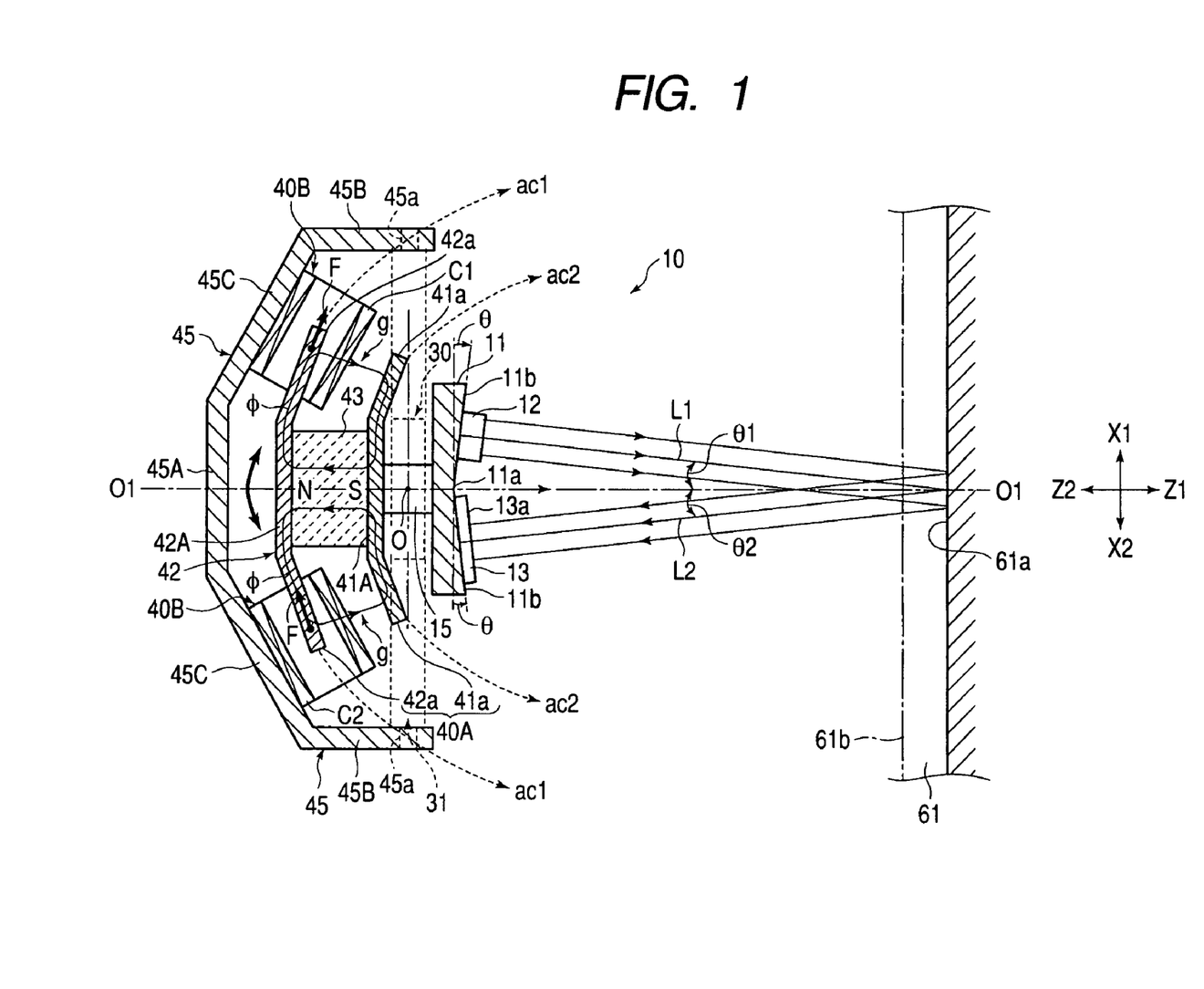
FIG. 1 is a sectional view illustrating a read head detecting data recorded by holography according to an embodiment of the invention.
Figure 2:
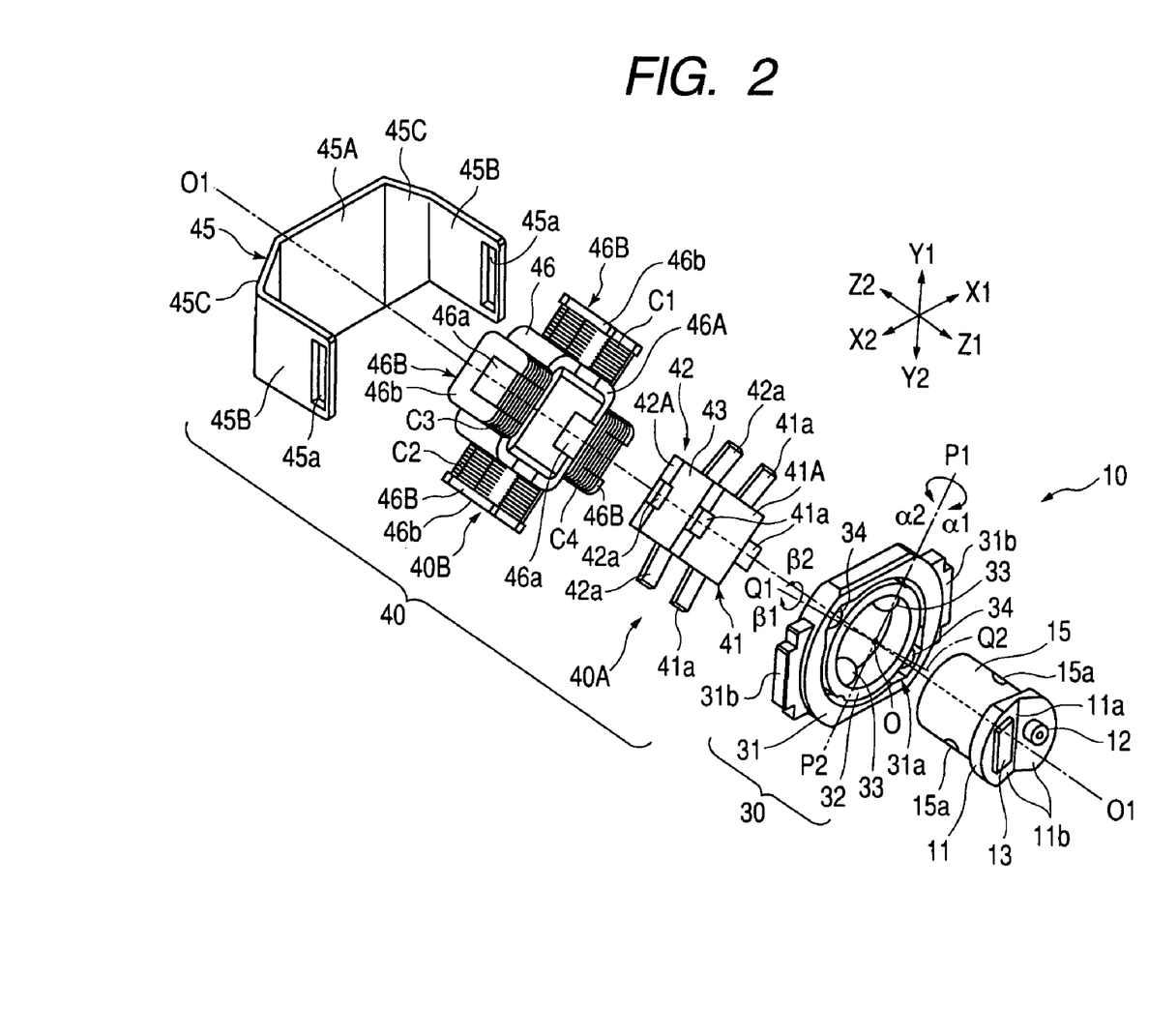
FIG. 2 is an exploded perspective view illustrating the read head.
Figure 3:
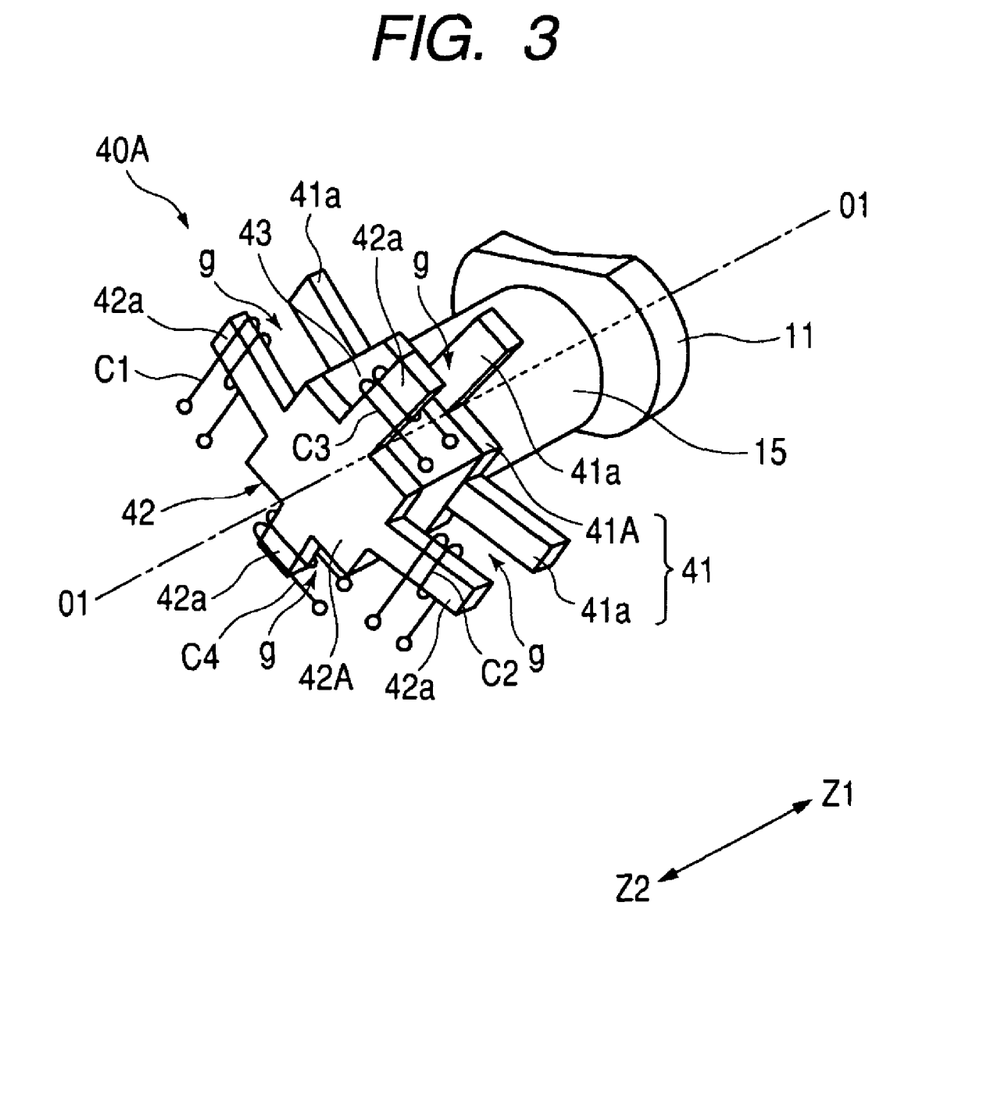
FIG. 3 is a perspective view illustrating a magnetic field generator disposed in the read head as viewed in a direction different from that of FIG. 2.

FIG. 1 is a sectional view illustrating a read head detecting data recorded by holography according to an embodiment of the invention. FIG. 2 is an exploded perspective view illustrating the read head. FIG. 3 is a perspective view illustrating a magnetic field generator disposed in the read head as viewed in a direction different from that of FIG. 2.

As shown in FIG. 1, a read head 10 according to an embodiment of the invention is a device reading a one-dimensional barcode in which plural lines and gaps are arranged in a width direction or a two-dimensional code in which black and white dot-like patterns are arranged, on the basis of a predetermined rule.

The read head 10 according to this embodiment roughly includes a fixed section fixing the entire device and a movable section swingably supported by the fixed section, as shown in FIG. 1.

The movable section includes a movable base 11 mounted with a sensor unit, a magnetic field generator 40A generating a magnetic field, and a movable shaft 15 disposed between the movable base 11 and the magnetic field generator 40A to connect both. The fixed section includes a fixed member 45 forming a frame, coils C (individually C1, C2, C3, and C4) constituting a magnetic driver 40B generating an electromagnetic force between the magnetic driver and the magnetic field generator 40A, and a support mechanism 30 swingably supporting the movable section.

The movable section will be first described. As shown in FIG. 1, the movable base 11 has a substantially disk shape and a surface in the Z1 direction in the drawing is provided with a light emitting member 12 and a light receiving member 13, which constitute the sensor unit.

For example, a vertical cavity surface emitting laser (VCSEL) outputting a laser beam having a predetermined wavelength is used as the light emitting member 12. In the light emitting member 12, plural VCSELs having different emission wavelength bands are received in a package and diffused beams can be obtained from the respective VCSELs. By selecting and lighting plural VCSELs, the wavelength of a reproducing reference beam can be changed. The diffused beams emitted from the light emitting member 12 can be applied to a data recording portion 61 to be described later in a state where the diffused beams are converted into parallel beams (laser beams) by a collimated lens not shown.

For example, a CCD, a CMOS image sensor, a photo diode (PD), and the like can be used as the light receiving member 13.

Here, an axis passing through a central portion 11a of the movable base 11 and the center of the movable shaft 15 in a longitudinal direction (in the Z1-Z2 direction in the drawing) is used as a reference axis O1-O1. Then, the light emitting member 12 and the light receiving member 13 are fixed to positions symmetric about the reference axis O1-O1 on the movable base 11.

As shown in FIG. 1, an angle formed by an optical axis of a laser beam (reproducing reference beam) L1 output from the light emitting member 12 and the reference axis O1-O1 is θ1 and an angle formed by a virtual vertical line vertical to the center of a light receiving surface 13a of the light receiving member 13 and the reference axis O1-O1 is θ2. Then, in the movable section, the light emitting member 12 and the light receiving member 13 are fixed to positions on the movable base 11 so as to satisfy θ1=θ2 (=θ).

Therefore, when the reference axis O1-O1 and a recording surface 61a of the data recording portion 61 vertically intersect each other, an incidence angle of the laser beam L1 is θ1 and a reflection angle of a return beam L2 reflected from the data recording portion 61 is θ2, where both angles are equal to each other (θ1=θ2). At this time, the light receiving member 13 including a photo diode or the like can receive the return beam L2 and read recorded data (codes) included therein.

When the data recording portion 61 is formed by a hologram recording medium and the recorded data is recorded as hologram data, the followings can be carried out. That is, when the laser beam L1 is applied as a reproducing reference beam to the surface 61b of the data recording portion 61 at a predetermined incidence angle θ1, the reproducing reference beam is applied to a hologram in the hologram recording medium (data recording portion 61), the reproducing reference beam is strongly diffracted (reflected) by an interference fringes of the hologram, and the diffracted beam is output as a reproduced beam (return beam) L2 from the data recording portion 61. Therefore, the light receiving member 13 including a CCD or a CMOS image sensor can read the recorded data (codes) included therein by receiving the return beam L2.

The movable shaft 15 includes a member extending in the Z2 direction from the other surface (surface in the Z2 direction) of the movable base 11. As shown in FIG. 2, a pair of concave portions 15a and 15a curved concavely with a predetermined radius of curvature is formed in the outer peripheral surface of the movable shaft 15. The concave portions 15a and 15a are formed at symmetric positions (positions different by 180 degrees) on the outer peripheral surface of the movable shaft 15.

The magnetic field generator 40A is disposed on an end surface of the movable shaft 15 in the Z2 direction in the drawing. The magnetic field generator 40A includes a first yoke 41, a second yoke 42, and a magnet 43 interposed therebetween.

As shown in FIGS. 2 and 3, the first yoke 41 includes a base portion 41A and four arm portions 41a, 41a, 41a, and 41a protruding in multiple directions (in four directions (cross directions) in this embodiment) from the base portion 41A. The arm portions 41a, 41a, 41a, and 41a are bent obliquely in the Z1 direction in the drawing from the bottom of the base portion 42A.

Similarly, the second yoke 42 includes a base portion 42A and four arm portions 42a, 42a, 42a, and 42a protruding in multiple directions (in four directions (cross directions) in this embodiment) from the base portion 42A. The arm portions 42a, 42a, 42a, and 42a are bent similarly to the arm portions 41a, 41a, 41a, and 41a. In this case, it is preferable that the directions of the arm portions 41a and the arm portions 42a are tangential directions of a virtual circular arc ac1-ac1 and a virtual circular arc ac2-ac2, which are centered on a rotation center O to be described later, respectively.

The magnet 43 is interposed between the base portion 41A and the base portion 42A. In this state, the arm portions 41a, 41a, 41a, and 41a and the arm portions 42a, 42a, 42a, and 42a are parallel to each other. Gaps g are formed at four positions where the arm portions 41a and the arm portions 42a are opposed to each other.

In the magnet 43, the surface facing the Z1 direction in the drawing is fixed as an S magnetic pole and the surface facing the Z2 direction is fixed as an N magnetic pole. A magnetic flux φ generated from the N magnetic pole of the magnet 43 is divided into four components at the time of going to four arm portions 42a from the base portion 42A of the second yoke 42. Then, as shown in FIG. 1, the magnetic fluxes φ enter the arm portions 41a of the first yoke 41 with four gaps g therebetween. The magnetic fluxes φ form four magnetic paths (magnetic circuits) which are collected by the arm portions 41a and are returned to the S magnetic pole of the magnet 43 via the base portion 41A of the first yoke 41. The magnetic fluxes φ interlink driving current flowing in the coils C1, C2, C3, and C4 at the time of passing through the gaps g.

The fixed section will be described now.

As shown in FIGS. 1 and 2, the fixed section includes the support mechanism 30 swingably supporting the movable shaft 15 of the movable section, the magnetic driver 40B, and the fixed member 45 holding the entire device including them.

As shown in FIG. 2, the support mechanism 30 includes a fixed base 31, a movable ring 32, and small spheres 33 and 33 and small spheres 34 and 34 located at positions perpendicular to each other. The fixed base 31 is a plate-like member having a circular opening 31a formed to penetrate the center thereof. Fixing portions 31b and 31b protruding convexly are formed at both ends of the fixed base 31 in the X direction.

The movable ring 32 is a ring-like member having an outer diameter smaller than the inner diameter of the opening 31a and having an inner diameter greater than the outer diameter of the movable shaft 15.

The movable shaft 15 is inserted into the movable ring 32. The small spheres 33 and 33 freely rotating are disposed between the concave portions 15a and 15a of the movable shaft 15 and a pair of concave portions (not shown) disposed in the inner peripheral surface of the movable ring 32. Accordingly, the movable shaft 15 is swingably supported by the small spheres 33 and 33. That is, the movable shaft 15 and the movable ring 32 are held relatively rotatable in the α1 and α2 directions in the drawing about a virtual axis P1-P2 (first axis) connecting the small sphere 33 and the small sphere 33.

A pair of concave portions (not shown) is disposed in the outer peripheral surface of the movable ring 32 and a pair of concave portions (not shown) opposed to the above-mentioned pair of concave portions is disposed in the inner peripheral surface of the fixed base 31. The small spheres 34 and 34 freely rotating are located at positions where the pair of concave portions of the movable ring 32 and the pair of concave portions of the fixed base 31 are opposed to each other, respectively. The small spheres 34 and 34 are disposed at positions different by 90 degrees in the peripheral direction from the small spheres 33 and 33. Accordingly, the movable ring 32 and the fixed base 31 are held relatively rotatable in the β1 and β2 directions in the drawing about a virtual axis Q1-Q2 (second axis) connecting the small sphere 34 and the small sphere 34.

That is, the movable shaft 15 is supported rotatable about two axes of the virtual axis P1-P2 (first axis) and the virtual axis Q1-Q2 (second axis) perpendicular thereto.

Here, an intersection of the rotation axis (virtual axis P1-P2 (first axis)) of the movable shaft 15 and the rotation axis (virtual axis Q1-Q2 (second axis)) of the movable ring 32 is the rotation center (the support center of the support mechanism) O. In this embodiment, the reference axis O1-O1 extending in the Z direction in the drawing is a straight line vertically passing through the rotation center (the support center of the support mechanism) O. Therefore, the movable shaft 15 can freely incline its posture from a posture corresponding to the reference axis O1-O1 to a different posture about the rotation center (the support center of the support mechanism) O.

The fixed member 45 is formed of a metal plate or a resin plate having a substantially U shape and the bottom surface 45A and both ends thereof are provided with side wall portions 45B and 45B extending in the Z1 direction in the drawing. Slope surfaces 45C and 45C are disposed between the bottom surface 45A and the side wall portions 45B and 45B. Longitudinal holes 45a and 45a penetrating in the X direction in the drawing and extending in the Y direction are formed in the end portions of the side wall portions 45B and 45B. The fixing portions 31b and 31b formed in the fixed base 31 can be fitted into the longitudinal holes 45a and 45a. That is, the fixed base 31 is supported by the fixed member 45.

As shown in FIG. 2, the magnetic driver 40B is formed of a resin material and includes a bobbin 46 formed in a substantially cross shape in a plan view. The bobbin 46 includes a substantially square frame 46A disposed at the center thereof and four cylindrical winding support portions 46B, 46B, 46B, and 46B protruding in four directions (in the X1, X2, Y1, and Y2 directions) from the outer peripheral surface of the frame 46A. Communication portions 46a, 46a, 46a, and 46a extending into the winding support portions 46B, 46B, 46B, and 46B from the inside of the frame 46A are formed in the outer peripheral surface of the frame 46A.

Flange portions 46b, 46b, 46b, and 46b being widened in the directions perpendicular to the four directions in which the winding support portions 46B extend are formed integrally with the ends of the winding support portions 46B, respectively. Cylindrical coils C1, C2, C3, and C4 are formed on the outer peripheries of the winding support portions 46B and between the outer peripheral surface of the frame 46A and the flange portions 46b. The bobbing 46 having four coils C1, C2, C3, and C4 is fixed to the bottom surface 45A of the fixed member 45.

As shown in FIG. 1, in this embodiment, the second yoke 42 is disposed inside the bobbin 46. That is, the base portion 42A of the second yoke 42 is disposed inside the frame 46A of the bobbin 46 and the arm portions 42a, 42a, 42a, and 42a extending from the second yoke 42 are inserted into the communication portions 46a, 46a, 46a, and 46a in the winding support portions 46B, 46B, 46B, and 46B. The ends of the arm portions 42a, 42a, 42a, and 42a are disposed inside the coils C1, C2, C3, and C4 with a movement margin and are opposed to the arm portions 41a, 41a, 41a, and 41a of the first yoke 41. In this state, the coils C1, C2, C3, and C4 are disposed in the gaps g.

As described above, when the arm portions 41a of the first yoke 41 and the arm portions 42a of the second yoke 42 are inclined, it is preferable that the coils C1, C2, C3, and C4 is configured to correspond thereto. That is, it is preferable that the protruding directions of the cylindrical coils C1 and C2 (the coils C3 and C4) shown in FIG. 1 correspond to the tangential lines of the virtual circular arc ac1-ac1 or the virtual circular arc ac2-ac2 centered on the rotation center O. In this way, when the directions of the arm portions 41a and 42a correspond to the directions of the coils C1 to C4 and the movable section is swung about the rotation center O, it is possible to prevent the arm portions 42a or the arm portions 41a from contacting or abutting the inner surfaces or the outer surfaces of the coils. In addition, it is possible to widen a swing range (movable range) of the movable section, thereby widening a readable range of the read head. In order to set the coils C1, C2, C3, and C4 to the directions shown in FIG. 1, four winding support portions 46B of the bobbin 46 can be provided to be oblique about the slope surfaces 45C of the fixed member 45.

When predetermined driving current is made to flow in one or both sets of the coils C1 and C2 and the coils C3 and C4, an electromagnetic force is generated. That is, a predetermined electromagnetic force corresponding to the Fleming's left-hand rule is generated in one or both of the coils C1 and C2 and the coils C3 and C4 by the driving current flowing in the coils and the magnetic flux φ generated in the gaps g. Since the electromagnetic force acts as driving forces F and F on the arm portions 42a and 42a, it is possible to swing the movable section about the rotation center O as a result. By changing the direction of the driving current flowing in the coils C1 to C4, the movable section can be swung in the direction opposite to the above-mentioned direction.

That is, by adjusting the direction and the magnitude of the driving current flowing in the coils C1 to C4, it is possible to swing the movable section about the rotation center O, thereby setting the sensor unit in a desired direction.

In this way, the magnetic field generator 40A and the magnetic driver 40B constitute the magnetic driving mechanism 40 freely swinging the movable section. The magnetic driving mechanism 40 and the support mechanism 30 constitute a biaxial actuator capable of freely changing the posture of the movable section.

A configuration of a driving control system of the read head will be described now with reference to an example.

Figure 4:
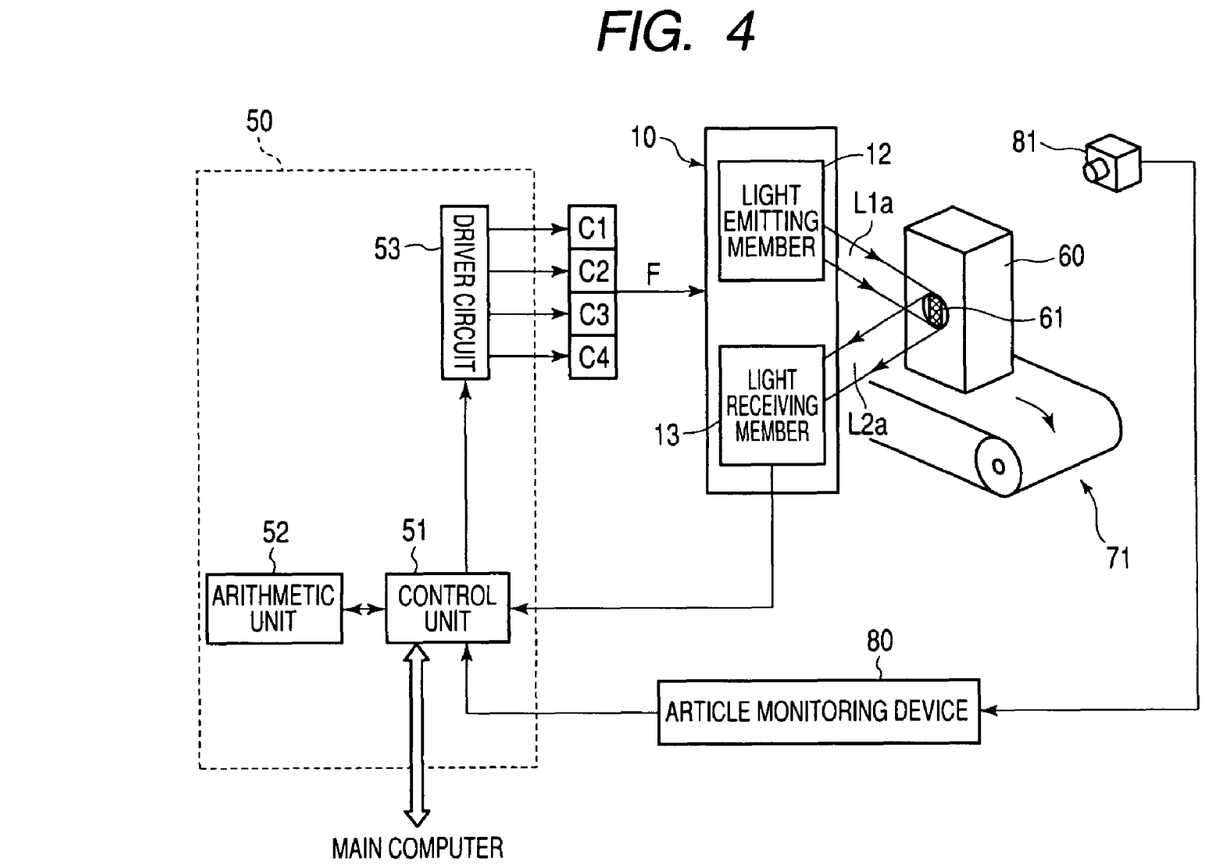
FIG. 4 is a block diagram illustrating an example of a driving control system of the read head according to an embodiment of the invention.

FIG. 4 is a block diagram illustrating an example of the driving control system of the read head according to the invention.

As shown in FIG. 4, the driving control system 50 of the read head 10 described in this example includes a control unit 51 having overall control, an arithmetic unit 52, and a driver circuit 53 generating the driving current applied to the coils C1 to C4.

The control unit 51 includes hardware having a CPU as a main body and software. The control unit 51 has control of the sensor unit, the arithmetic unit 52, and the driver circuit 53 and has control of transmission and reception of signals to and from a main computer disposed in the outside.

Operations of the read head will be described now with reference to FIG. 4.

In the following example, the read head 10 is used as an automatic sorting system reading the hologram data (codes) recorded in the data recording portion 61 which is disposed in each of the articles conveyed by the conveyor 71 and sorting delivery destinations of articles 60 on the basis of destination information included in the hologram data. In the read head 10, the fixed member 45 is fixed to a predetermined position in the system by means not shown and the sensor unit (the light emitting member 12 and the light receiving member 13) of the movable section faces the articles 60 flowing on a conveyor 71.

The automatic sorting system includes, for example, an article monitoring device 80 having plural cameras 81 for monitoring the articles 60 flowing on the conveyor 71 and various switches. When an article 60 reaches the front position of the read head 10, the article monitoring device 80 senses the fact and notifies the control unit 51 of the sense result.

When receiving a predetermined notification from the article monitoring device 80, the control unit 51 drives the light emitting member 12 to apply a laser beam having a predetermined wavelength as a reproducing reference beam L1a. The reproducing reference beam L1a is output to the data recording portion 61 of an article 60 in which the hologram data is recorded and a return beam L2a reflected by the data recording portion 61 is incident on the light receiving member 13. The return beam L2a includes the hologram data recorded in the data recording portion 61. The light receiving member 13 reads and outputs the hologram data to the control unit 51. The control unit 51 analyzes the hologram data and sends necessary data such as destination information included therein to the main computer controlling the overall automatic sorting system. The automatic sorting system sorts the articles using means not shown on the basis of the data.

Plural holograms (which are calls pages) are recorded in the data recording portion 61 in an angle-multiplexed manner. In the movable section, the incidence angle θ1 of the reproducing reference beam L1a on the data recording portion 61 is set to a predetermined angle in advance so as to always first read a predetermined reference page (first page in general) at the time of application of the reproducing reference beam L1a.

However, when the article 60 flowing on the conveyor 71 is inclined or the like, the reference page may not be read.

In this case, the arithmetic unit 52 calculates angle error data which is a difference between the incidence angel of the first read page and the incidence angle of the reference page from the hologram data recorded in the first read page (a page other than the reference page) and sends the calculated angle error data to the control unit 51. The control unit 51 generates a feedback signal based on the angle error data and sends the generated feedback signal to the driver circuit 53. Then, the driver circuit 53 generates driving current based on the feedback signal and applies the generated driving current to the coils C1 to C4. The movable section is driven on the basis of the driving current flowing in the coils C1 to C4 and the incidence angle θ1 of the reproducing reference beam L1a is set to the predetermined angle. Accordingly, the light receiving member 13 can read the hologram data recorded in the reference page.

When it is intended to read another page, similarly, another page can be read by the use of the light receiving member 13 while changing the direction and magnitude of the driving current applied to the coils C1 to C4 and adjusting the incidence angle θ1 of the movable section, thereby reading the hologram data recorded in all the pages.

Accordingly, in the invention, it is possible to drive the actuator to control the posture of the movable section on the basis of the hologram data detected by the light receiving member 13.

When the data recording portion 61 is a medium other than the hologram recording medium, it is preferable that the actuator is driven so that the incidence angle θ1 and the reflection angle θ2 always satisfy the relation of θ1=θ2.

In this way, by maintaining the relation of θ1=θ2, the return beam reflected by the data recording portion 61 can be guided vertically to the light receiving surface 13a of the light receiving member 13, thereby satisfactorily reading data recorded in the data recording portion 61.

It can be implemented to maintain the relation of θ1=θ2, for example, as shown in FIG. 1, by symmetrically forming slope surfaces 11b and 11b, the central portions 11a of which are thin and the thicknesses of which gradually increase toward the edges, in the movable base 11 regarding the shape of the surface of the movable base 11 facing the Z1 direction and disposing the light emitting member 12 and the light receiving member 13 on the slope surfaces 11b and 11b, respectively.

A phenomenon of phase conjugation occurs in the hologram recording medium. Accordingly, when the relation of θ1=θ2 is not satisfied, the light receiving member 13 can acquire the return beam L2a.

Although the read head is applied to the automatic sorting system in the above-mentioned embodiment, the invention is not limited to the automatic sorting system. For example, the invention can be applied to, for example, a read head sequentially reading cards in which data such as hologram data is recorded.

Although the hologram data is detected in the above-mentioned embodiment, the invention is not limited to the hologram data. The invention can be applied to a read head detecting one-dimensional barcodes or two-dimensional barcodes.

It should be understood by those skilled in the art that various modifications, combinations, sub-combinations, and alterations may occur depending on design requirements and other factors insofar as they are within the scope of the appended claims and the equivalents thereof.

What is claimed is:

1. A read head comprising:
   a light emitting member outputting a predetermined laser beam to a data recording portion;
   a light receiving member receiving a return beam reflected by the data recording portion and detecting data included in the return beam;
   a movable section mounting the light emitting member and the light receiving member thereon;
   a fixed section, including:

a fixed member; and a support mechanism swingably supporting the movable section; and a driving mechanism swinging the movable section with respect to the fixed section, wherein the driving mechanism includes:

a magnetic field generator disposed on one of the movable section and the fixed section; and a magnetic driver disposed on the other of the movable section and the fixed section, wherein the magnetic field generator includes:

a first yoke having a first base portion and a plurality of first arm portions protruding outwardly from the first base portion;

a second yoke having a second base portion and a plurality of second arm portions protruding outwardly from the second base portion; and a magnet disposed between the first base portion and the second base portion, the first arm portions and the corresponding second arm portions being opposed to each other;

wherein the magnetic driver includes a plurality of coils, and wherein each of the second arm portions is disposed in corresponding one of the coils with a movement margin.

2. The read head according to claim 1, further comprising a control unit generating a feedback signal for controlling the posture of the movable section on the basis of the data detected by the light receiving member.

3. The read head according to claim 1, wherein the light receiving member is one of a CCD, a CMOS image sensor, and a PD.

4. The read head according to claim 1, wherein the data included in the return beam is hologram data.

5. The read head according to claim 1, wherein the movable section swings about a predetermined rotation center, the protruding directions of the first and second arm portions are tangential directions of a circle centered on the rotation center, and winding centers of the coils are directed to the tangential directions.

6. The read head according to claim 1, wherein the magnetic field generator is provided on the movable section, and the magnetic driver is provided on the fixed member of the fixed section.

7. The read head according to claim 1, wherein the support mechanism allows the movable section to swing around a first virtual axis and a second virtual axis perpendicular to the first axis.

8. The read head according to claim 1, wherein the movable section comprises:

a base having a substantially disk shape, the light emitting member and the light receiving member being provided on a first face of the base; and a shaft extending from a second face of the base opposite to the first face, wherein the support mechanism comprises:

a base frame fixed to the fixed member; and a movable ring movably provided in the base frame, the movable ring receiving the shaft of the movable section.

9. The read head according to claim 8, wherein the movable ring is rotatable around a first virtual axis with respect to the base frame, and the shaft is rotatable around the second virtual axis with respect to the movable ring, an intersection of the first virtual axis and the second virtual axis providing a center of rotation of the shaft.

\* \* \* \* \*